United States Patent [19]

Bekanich

[11] Patent Number: 5,450,173
[45] Date of Patent: Sep. 12, 1995

[54] DUPLICATING DEVICE FOR PRODUCING COPIES OF THREE-DIMENSIONAL OBJECTS

[75] Inventor: Joseph Bekanich, Kingston, Pa.

[73] Assignee: Optica U.S.A., Wilkes-Barre, Pa.

[21] Appl. No.: 188,905

[22] Filed: Jan. 31, 1994

Related U.S. Application Data

[63] Continuation-in-part of Ser. No. 73,487, Jun. 9, 1993, abandoned.

[51] Int. Cl.⁶ .................................. G03G 15/04
[52] U.S. Cl. .......................... 355/228; 355/230; 355/67; 355/75; 362/8
[58] Field of Search ............. 355/228, 230, 229, 231, 355/67, 70, 75; 362/8, 16

[56] References Cited

U.S. PATENT DOCUMENTS

| | | | |
|---|---|---|---|
| 3,308,716 | 3/1967 | Caporael | 362/8 |
| 3,710,078 | 1/1973 | Lemelson . | |
| 4,454,210 | 6/1984 | Ariyama et al. . | |
| 4,575,215 | 3/1986 | Ariyama et al. . | |
| 4,816,921 | 3/1989 | Akiyama et al. . | |
| 4,879,604 | 11/1989 | Koshiyouji . | |
| 4,893,196 | 1/1990 | Koshiyouji et al. . | |
| 5,012,353 | 4/1991 | Yoshino et al. . | |
| 5,119,212 | 6/1992 | Mori et al. . | |

*Primary Examiner*—Joan H. Pendegrass
*Attorney, Agent, or Firm*—Nies, Kurz, Bergert & Tamburro

[57] ABSTRACT

A portable duplicating device which may be used with any commercially available photocopy machine to provide two-dimensional copies of two or three dimensional objects.

40 Claims, 4 Drawing Sheets

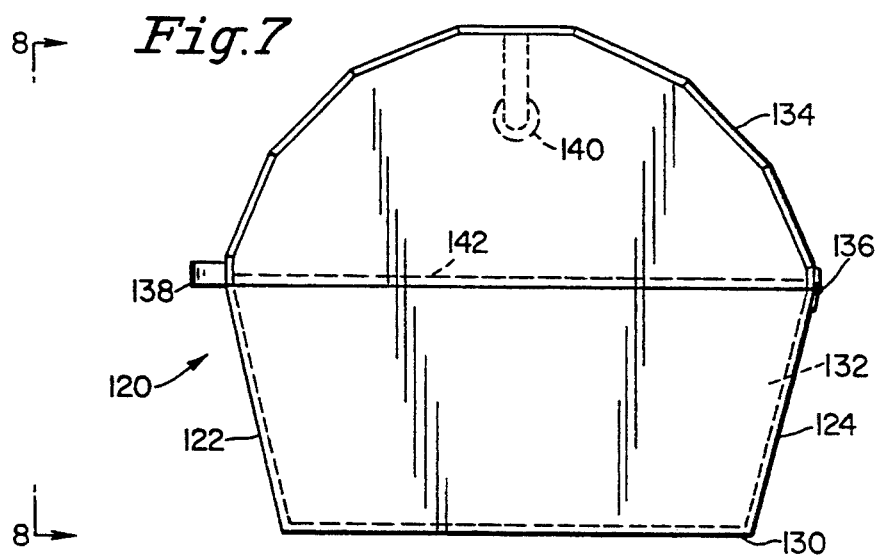
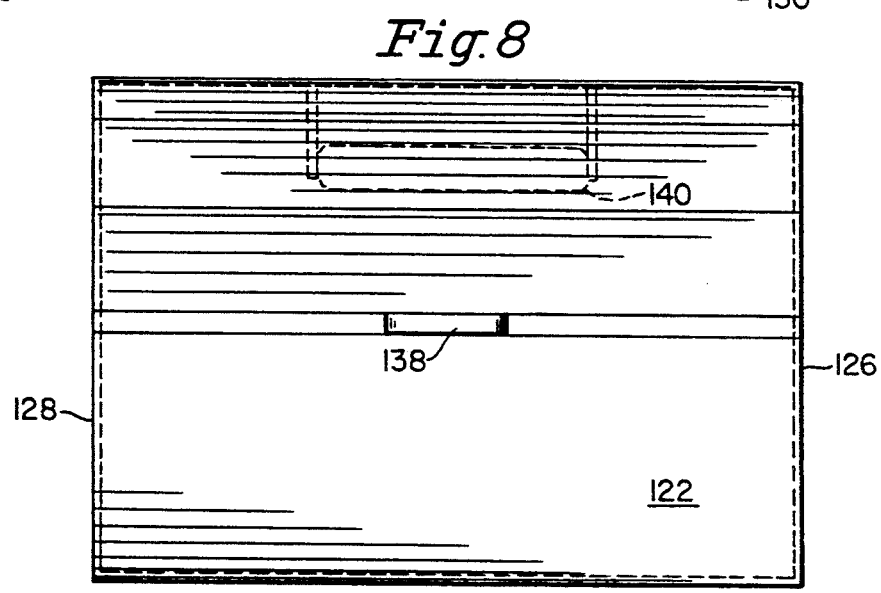
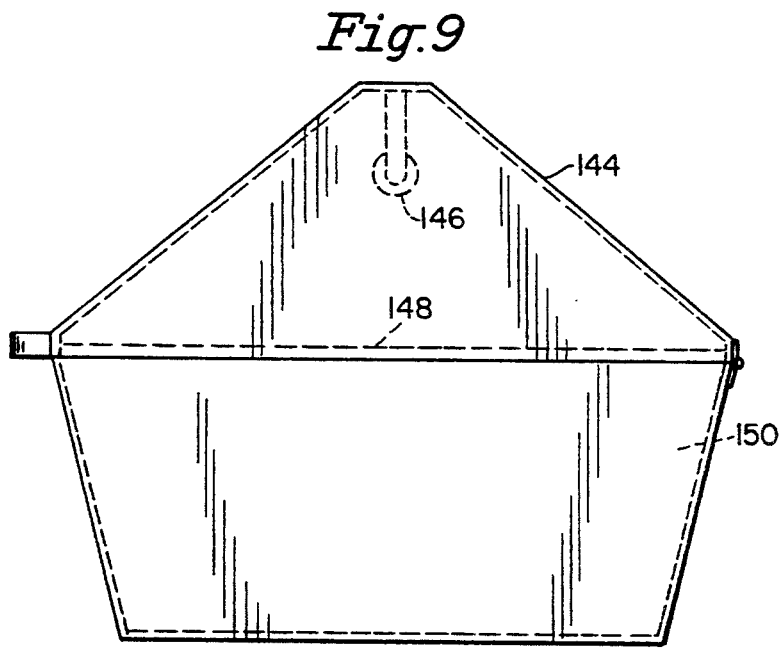

DUPLICATING DEVICE FOR PRODUCING COPIES OF THREE-DIMENSIONAL OBJECTS

RELATED APPLICATIONS

This application is a continuation-in-part of application Ser. No. 08/073,487, filed Jun. 9, 1993, now abandoned.

BACKGROUND OF THE INVENTION

This invention relates generally to duplicating apparatus and more particularly to a portable duplicating device which may be used with any commercially available photocopy machine to provide two-dimensional copies of two or three-dimensional objects to the approximate scale of the objects.

Common commercially available photocopy machines are limited to reproducing acceptable copies of two-dimensional flat objects or sheets of paper. Quite often it is desirable to provide two-dimensional elevational or plan views of three-dimensional objects for engineering, production, research and development, or fax transmittal purposes, and currently this must be done by hand or with computer aided design equipment. It would be very beneficial, both from a cost and time standpoint, if the various sides of a three-dimensional object could be quickly reproduced in two-dimensional sheet form using any commercially available photocopy machine.

Prior art U.S. Pat. Nos. 4,454,210 and 4,575,215 illustrate special copying apparatus intended for use in the medical field to produce reproductions of three-dimensional body parts and organs. However, the apparatus there described is complicated, awkward and messy and has no practical use in the common work place environment.

OBJECTS OF THE INVENTION

Accordingly the primary object of this invention is to provide a portable duplicating device which may be used with any commercially available photocopy machine to provide quick two-dimensional reproductions of two or three-dimensional objects.

A further object of the invention resides in the provision of the above portable duplicating device in which the two-dimensional reproductions illustrate the approximate scale of the three-dimensional object.

Still another object of the invention resides in the provision of the above described duplicating device in one form as a luminescent box which comprises a transparent bottom plate which overlies directly on the glass reproduction surface of the conventional photocopier, a dome shaped lid finished in a light reflective surface, and a light source that illuminates the inside of the box when the domed lid is in its closed position.

Another object of the invention resides in the provision of the above described portable luminescent box which may be readily mounted in place on the glass reproduction surface of a conventional photocopier and in which three-dimensional objects may be quickly inserted into and removed from to facilitate the provision of two-dimensional reproductions in sheet form from the three-dimensional objects within the box.

Another object of the invention resides in the provision of another embodiment of the above-described duplicating device wherein the luminescent box is open at the bottom and the bottom opening may directly overlie the glass reproduction surface of a conventional photocopier, or alternatively, may rest on a transparent, flexible plastic sheet lying on top of the glass reproduction surface of the copier.

A further object of the invention resides in the provision of the above-described embodiments of the duplicating device wherein the light source is mounted within the lid and a light-diffusing sheet or plate is mounted within the lid or box between the light source and the object being copied.

Still another object of the invention resides in a provision of the abovedescribed embodiments of the duplicating device wherein the dome or lid and the box may be of various configurations to best reflect the light down upon the object to be copied.

Other objects and advantages will become readily apparent from reading the following detailed description of the invention in which reference is made to the accompanying drawings wherein like numerals indicate like elements.

BRIEF DESCRIPTION OF THE DRAWINGS

FIG. 7 is a side elevational view of a third embodiment of the duplicating device of the invention.

FIG. 8 is a front elevational view taken along line 8—8 of FIG. 7.

FIG. 9 is a side elevational view of another embodiment of the invention similar to FIG. 7 but having a different-shaped dome or lid.

DETAILED DESCRIPTION OF THE INVENTION

Figure 1:
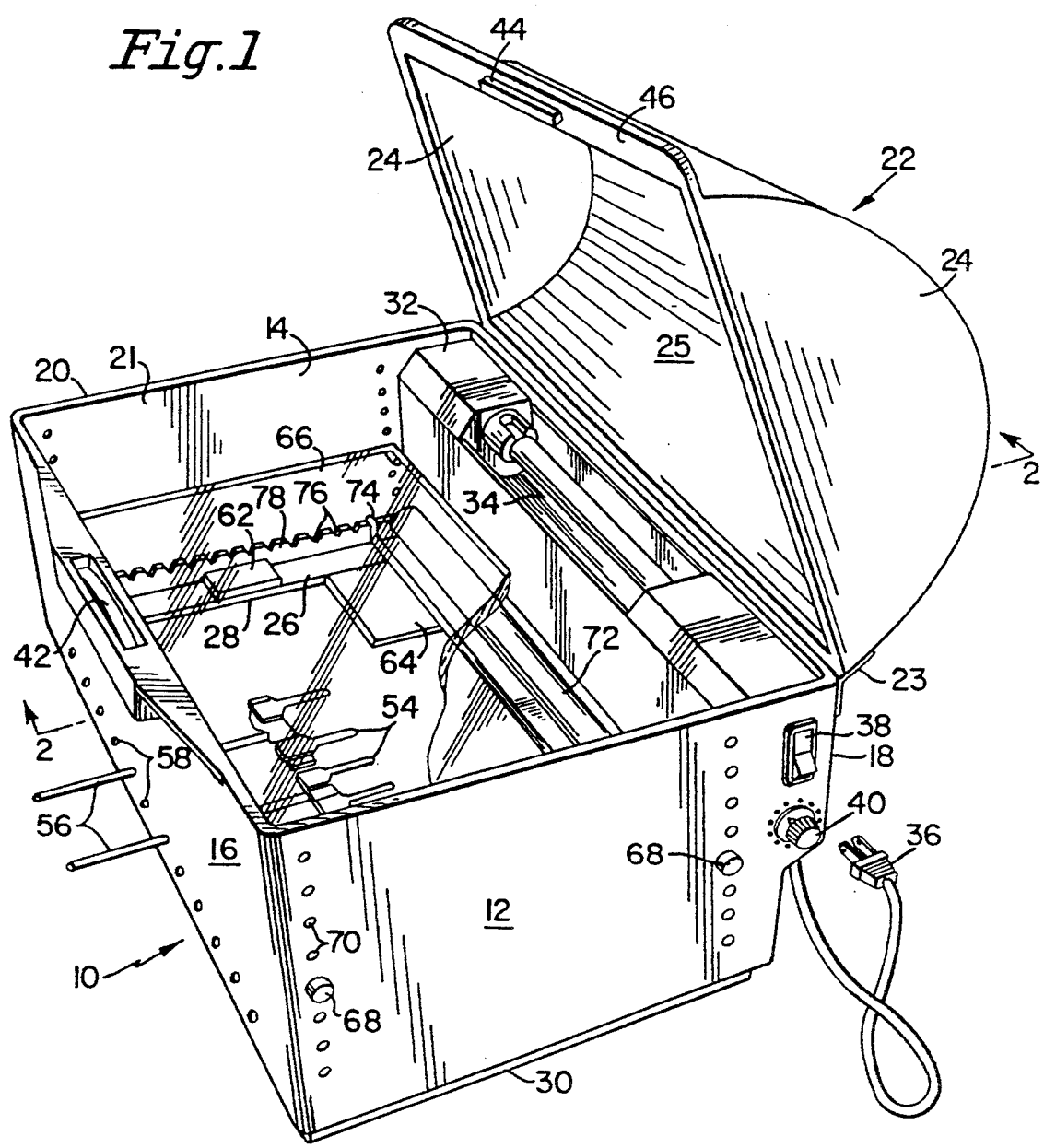
FIG. 1 is a general right perspective view of one embodiment of the duplicating device of the invention.

Referring now to the drawings, the duplicating device of the embodiment of the invention of FIG. 1 comprises a luminescent box 10 formed by side walls 12 and 14, front wall 16 and rear wall 18. The upper edges 20 of the walls define a top opening 21 and a domed lid 22 is pivotally connected by a hinge 23 to rear wall 18. Lid 22 has a pair of vertical side walls 24 and a semi-cylindrical top wall 25. In the closed position of the lid shown in FIG. 2, side walls 24 essentially align with side walls 12 and 14 and top wall 25 extends between front wall 16 and rear wall 18.

The walls 12, 14, 16 and 18 and lid 22 are preferably constructed of lightweight plastic material. The interior surfaces of walls 12, 14, 16, and 18 and of walls 24 and 25 of domed lid 22 are coated with a white, light reflective material to provide high intensity light within the box during the photocopying process.

Bottom wall 26 of box 10 is provided with a rectangular opening 28 which is covered by a transparent bottom plate 30 having soft thin pads 31 that may rest closely adjacent to or directly on the glass reproduction surface of a conventional photocopying machine. Alternatively, opening 28 may be left open and a thin, clear, replaceable, disposable, vinyl sheet may be placed between bottom wall 26 and the glass surface of the copier. If the sheet becomes scratched or otherwise marred, it is easily replaced by a new sheet.

Figure 2:
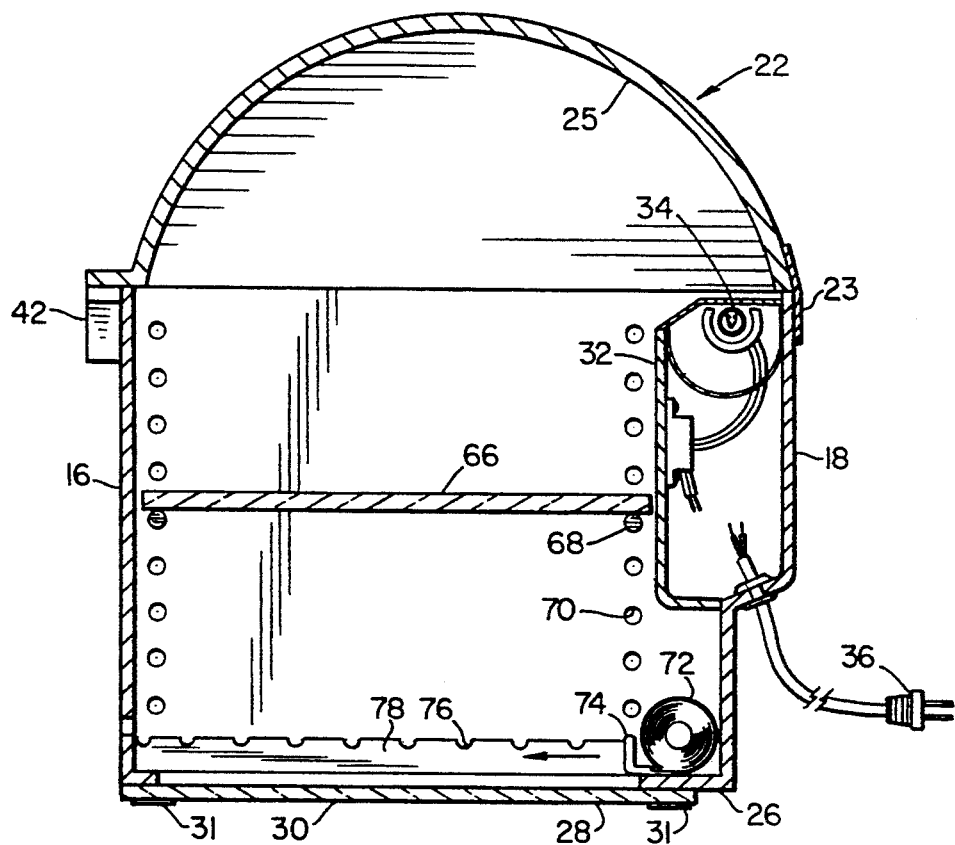
FIG. 2 is a partially fragmented sectional view taken generally along line 2—2 of FIG. 1 with the dome in its closed position.

Mounted against the rear wall 18 is a light fixture assembly 32 containing a high intensity photolamp 34 which projects light upwardly against the reflective surface 25 of lid 22, with surface 25 then reflecting that light downwardly within the chamber 35 defined by space of walls 12, 14, 16 and 18 and lid 22 (FIG. 2).

Lamp 34 is powered from a conventional A.C. power source using a standard electrical outlet and plug 36. The lamp circuitry includes a conventional manually operated on/off switch 38 and a rheostat 40 to adjust the light intensity of lamp 34. The lamp circuitry also includes a safety interlock switch and latch 42 mounted at the top of front wall 16 and actuated by a latch element 44 on the front flange 46 of lid 22 when the lid is moved to its closed position shown in FIG. 2. When the lid 22 is open as in FIG. 1, switch 42 is opened and lamp 34 is deenergized. When the lid is moved to its closed position of FIG. 2 switch 42 is closed, lamp 34 is energized and the box is ready for use.

To use the box 10 in conjunction with a standard photocopy machine, the box is merely placed on the machine with its transparent bottom plate 30 overlying the glass reproduction surface of the photocopier. With the box properly positioned on the copier, the power supply circuit to lamp 34 properly energized, and the lid 22 in its open position as shown in FIG. 1, a three-dimensional object such as the bolt 50 (FIG. 4) may be placed within chamber 35 directly on the top surface of transparent plate 30 and positioned as desired. Lid 22 is then closed to the position of FIG. 2 thereby closing switch 42 and lighting the high intensity lamp 34. The conventional photocopier may then be operated in normal fashion to quickly provide a two-dimensional reproduction of the side of the bolt 50 which is resting on plate 30.

Any three-dimensional object may be placed within box 10 on top of plate 30 and a number of two-dimensional reproductions of the various sides of that object may be obtained simply by turning that object and placing the desired side on plate 30.

Figure 4:
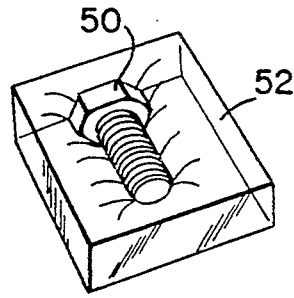
FIG. 4 illustrates a clear gel pad used to support odd shaped items in place on the transparent bottom plate of the device of FIG. 1.

Instead of supporting the three-dimensional object 50 directly on plate 30 the object may be supported by various other means, for example, a clear gel pad 52 such as that shown in FIG. 4, or horizontally adjustable support elements 54 supported by rods 56 extending through openings 58 provided in one of the walls of the box, for example, front wall 16. For special applications transparent plastic fixtures resting on plate 30 may be used to support three-dimensional objects of special configuration.

Figure 3:
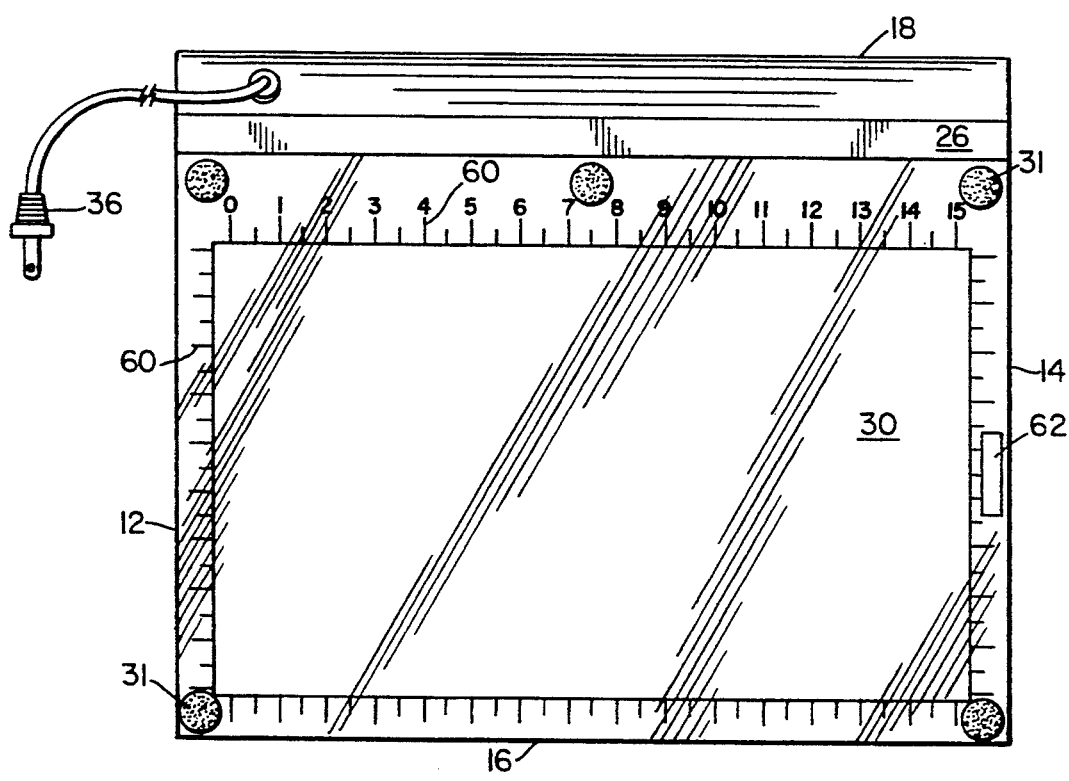
FIG. 3 is a bottom plan view of the duplicating device illustrated in FIG. 1.

As shown in the bottom plan view of FIG. 3 calibration marks 60 are provided around the perimeter of bottom plate 30 to indicate the approximate size of the three-dimensional object being copied. In addition, a date/time clock 62 mounted on the inside surface of bottom wall 26 automatically indicates the date and time on which the two-dimensional reproduction was made. Similarly an I.D. card holder 64 may be placed within the box on top of plate 30 to provide identifying information.

For certain applications a removable transparent plate 66 may be inserted into the box at a selected height at which it is supported by removable dowel pins 68 passing through selected openings 70 in side walls 12 and 14. On this plate 66 various designs or backgrounds can be cast onto the resulting copy to provide a three-dimensional effect using the cast image as a background.

For some applications, plate 66 may be a magnification plate to enlarge the size of the object on the copy which is produced.

For some applications it may be desirable to black out or white out a certain area of the reproduction surface. To accomplish this a black shade or a white shade may be pulled over part of the upper surface of plate 30 and maintained in that position by hooks 74 engaging in notches 76 of side bars 78 fixed against side walls 12 and 14.

While the luminescent box 10 as illustrated is of fixed rectangular shape, for example, having internal dimensions of 14 inches by 17 inches, it may be constructed with telescoping features to provide for adjustment and ease of handling.

Figure 5:
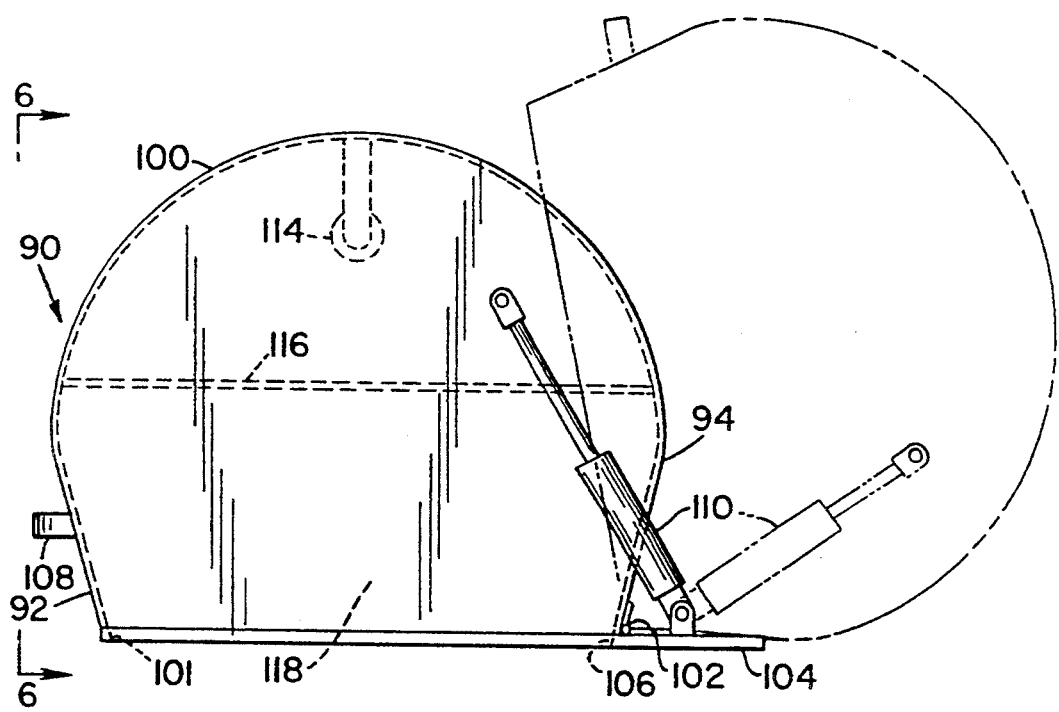
FIG. 5 is a side elevation view of a second embodiment of the duplicating device of the invention.
Figure 6:
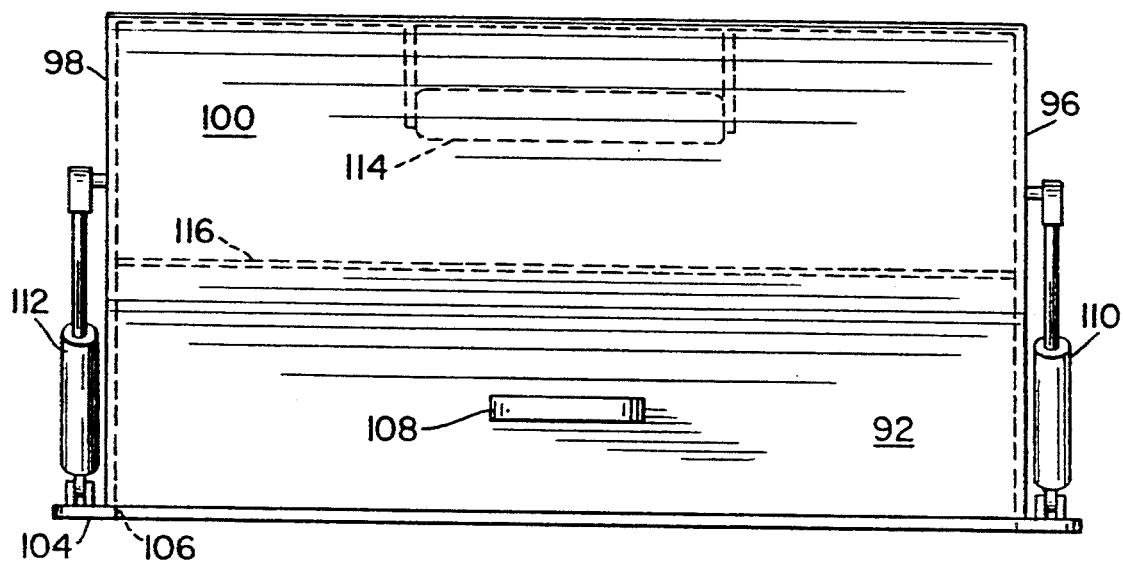
FIG. 6 is a front elevational view taken along line 6—6 of FIG. 5.

Referring now to FIGS. 5 and 6, a second embodiment of the duplicating device of the invention includes a unitary box 90 formed by upwardly and outwardly tapering front and rear walls 92 and 94, side walls 96 and 98, all of which join together with a top wall which converges upwardly and inwardly and is shaped as a semi-cylindrical dome or lid 100. Rear wall 94 is connected by a hinge 102 to a flat strip metal frame 104 which has a rectangular opening 106 underlying the bottom opening 101 of box 90 and adapted to overlie the glass surface of a conventional copier. A front handle 108 facilitates the raising of box 90 from its operative position shown in full in FIG. 5 to its raised, inoperative position shown in phantom. A pair of gas springs, 110 and 112, limits the speed with which the box may be raised or lowered.

A high-intensity light source such as a 500 watt to 1,000 watt quartz bulb 114 is mounted centrally within the dome 100 and a thin vinyl or glass diffuser sheet or plate 116 is mounted within dome 100 between the light source 116 and the object receiving chamber 118 defined by walls 92, 94, 96 and 98. If necessary or desired, more than one light 114 may be provided within various locations of dome 100 and/or box 90.

As in the embodiment of FIG. 1, the interior surfaces of walls 92, 94, 96 and 98 and dome 100 are all light-reflective and this may be accomplished by highly polishing the surfaces, or coating them with a white, light-reflective material, or lining them with mirrored material.

In using box 90, the frame 104 may rest directly on the glass surface of the copier machine, or preferably, is placed on a thin, clear, vinyl sheet covering and protecting the glass surface of the copier machine.

When box 90 is being used, the three-dimensional object will be located within chamber 118 and light from bulb 114 is deflected downwardly from the inner surface of dome 100 and diffused uniformly by diffuser plate 116 downwardly onto the object being copied.

The embodiment of the invention illustrated in FIGS. 7 and 8 includes a luminescent box 120 formed by upwardly and outwardly tapering front and rear walls 122 and 124, sidewalls 126 and 128, with the box being open at its bottom or being closed by a transparent glass or vinyl sheet or plate 130 as described with respect to FIG. 1. Vertical walls 122, 124, 126 and 128 define an object receiving chamber 132 which is open at its upper end and is adapted to be closed by a top wall shaped as a generally semi-cylindrical dome or lid 134 which is pivotally connected by a hinge 136 to rear wall 124. Front handle 138 facilitates raising and lowering lid 134.

As in FIG. 5, a high-intensity quartz bulb 140 is centrally mounted within lid 134 and a diffuser sheet or plate 142 is mounted within lid 134 to diffuse the light passing from bulb 140 into chamber 132.

As in FIG. 5, the interior surfaces of dome 134 and vertical walls 122, 124, 126 and 128 are highly light-reflective.

The embodiment of the duplicating box of the invention illustrated in FIG. 9 is essentially the same as that shown in FIGS. 7 and 8 except for the shape of the dome 144 which is of an upwardly and inwardly tapered or sloping configuration in contrast to the generally semi-cylindrical shape of the dome in FIGS. 5 and 7. As in the other embodiments, the dome includes a light source 146 and a diffuser plate 148 for providing high-intensity, uniform light downwardly onto an object located within chamber 150.

The various features described above with respect to the duplicating box of FIG. 1 may also be incorporated into the embodiments illustrated in FIGS. 5, 7 and 9.

Other modifications may be made to the various embodiments. For example, the effective vertical height of the boxes may be varied. In FIGS. 1, 7 and 9, this may be done by increasing or decreasing the vertical height of the side walls or by constructing those sidewalls in two pieces, with one piece being removable, or constructing those sidewalls in telescoping fashion so that the height is quickly and easily adjusted to accommodate objects of various sizes. In the embodiment of FIG. 5, the vertical height of walls 92, 94, 96 and 98 may be varied to accommodate objects of various sizes.

In some devices, it may be desirable to provide a sidewall entry opening for hands or objects close to the bottom of the object receiving chamber. This can be readily done in any of the embodiments described above. It may also be desirable to provide a viewing window through one of the sidewalls of the box in order to see that the object is properly positioned within the box. Instead of the pivotable lid as in FIGS. 1, 7, and 9, the lid may be fixed and a sidewall may be pivotable for access.

From the description hereinabove, it is apparent that the portable luminescent box of the invention is a device which may be quickly and easily operated in conjunction with conventional photocopying machines to provide two-dimensional reproductions to approximate scale from three-dimensional objects. For many applications such a reproduction is adequate and will replace the need to draft various side elevations or plan prints by hand or to generate such prints with computer aided design equipment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Portable apparatus for use with a conventional photocopy machine having a reproduction surface to provide a two dimensional copy from a three-dimensional object, said apparatus comprising a generally rectangular housing having vertical side walls, a front wall, and a rear wall defining an internal chamber with a top opening and a bottom opening, a transparent bottom plate covering said bottom opening, a removable lid for covering and uncovering said top opening, said lid having a light reflective inner surface, a light source mounted within said chamber for illuminating said chamber and emitting light against said light reflective surface when said lid covers said top opening, said light reflective inner surface reflecting light downwardly into said chamber and onto said transparent bottom plate and on an object supported therebetween, whereby said apparatus may be positioned on the photocopy machine with said bottom transparent plate overlying the reproduction surface of the machine which then may be operated in conventional fashion to provide a two-dimensional copy from a three-dimensional object supported in said chamber.

2. The portable apparatus defined in claim 1, the inside surfaces of said walls being light reflective.

3. The portable apparatus defined in claim 1, said reflective inner surface being of substantially semi-cylindrical shape and extending between said front and rear walls, and said light source being mounted adjacent one of said front and rear walls.

4. The portable apparatus defined in claim 3, said lid being pivotally mounted adjacent said rear wall, and said light source being mounted adjacent said rear wall.

5. The portable apparatus defined in claim 4, an electrical power circuit for said light source including switch means operable to energize said light source when said lid is closed and to deenergize said light source when said lid is opened.

6. The portable apparatus defined in claim 5, said circuit including means for adjusting the intensity of said light source.

7. The portable apparatus defined in claim 1, comprising means connected to one of said walls for supporting an object within said chamber.

8. The portable apparatus defined in claim 1, comprising a transparent plate removably mounted within said chamber above said bottom plate and an object supported between said plates for providing background images onto the resultant two-dimensional copy.

9. Portable apparatus as defined in claim 1, comprising markings on said transparent bottom plate which indicate the size of the object on the two-dimensional copy.

10. Portable apparatus as defined in claim 1, comprising means visible on said transparent bottom plate to indicate date and/or time on the two-dimensional copy.

11. Portable apparatus as defined in claim 1, comprising adjustable roll-up shade means mounted above said bottom plate to selectively shade areas of the bottom plate.

12. Portable apparatus for use with a conventional photocopy machine having a reproductive surface to provide a two-dimensional copy from a three-dimensional object, said apparatus comprising a generally rectangular housing having vertical side walls, a front wall, and a rear wall defining an internal chamber with a top opening and a bottom opening, a transparent bottom plate covering said bottom opening, a lid pivotally mounted adjacent said rear wall for opening and closing said top opening, said lid having a pair of vertical side walls and an arcuate shaped top wall extending between said front and rear walls of said housing when said lid is in a closed position, the inner surface of said arcuate wall being light reflective, a light source mounted within said chamber adjacent said rear wall, said light source illuminating said chamber and emitting light against said arcuate surface when said lid covers said top opening, said arcuate surface reflecting light downwardly into said chamber and onto said transparent bottom plate and on an object supported therebetween, whereby said apparatus may be positioned on a photocopy machine with said bottom transparent plate overlying the reproduction surface of the machine which then may be operated in conventional fashion to provide a two-dimensional copy from a three-dimensional object supported in said chamber.

13. Portable apparatus as defined in claim 12, wherein the inside surfaces of all of said walls are light reflective.

14. Portable apparatus as defined in claim 12, wherein said arcuate surface is of substantially semi-cylindrical shape.

15. Portable apparatus as defined in claim 14, comprising an electrical power circuit for said light source including switch means operable to energize said light source when said lid is closed and to deenergize said light source when said lid is opened.

16. Portable apparatus as defined in claim 15, including means for adjusting the intensity of said light source.

17. Portable apparatus as defined in claim 12, comprising means connected to one of said walls of said housing for supporting an object within said chamber.

18. Portable apparatus as defined in claim 12, comprising a transparent plate removably mounted within said chamber above said bottom plate and an object supported therein for providing background images onto the resultant two-dimensional copy.

19. Portable apparatus as defined in claim 12, comprising markings on said transparent bottom plate which indicate the size of the object on the two-dimensional copy.

20. Portable apparatus as defined in claim 12, comprising means visible on said transparent bottom plate to indicate a date and/or time on the two-dimensional copy.

21. Apparatus for use with a conventional reproduction machine having a reproduction surface to provide a reproduction from a three-dimensional object, said apparatus comprising a housing having vertical walls and a top wall defining an internal chamber with a bottom opening adapted to overlie the reproduction surface of the machine, said top wall having a light reflective inner surface, a light source mounted within said chamber for illuminating said chamber and emitting light against said light reflective inner surface, said light reflective inner surface reflecting light downwardly into said chamber and onto an object supported within said chamber, whereby said apparatus may be positioned on the reproduction machine with said bottom opening overlying the reproduction surface of the machine which then may be operated in conventional fashion to provide a reproduction from a three-dimensional object supported in said chamber.

22. The apparatus defined in claim 21, the inside surfaces of said walls being light reflective.

23. The apparatus defined in claim 21, said top wall converging upwardly and inwardly from said vertical walls, and said light source being mounted adjacent said top wall.

24. The apparatus defined in claim 23, said top wall being a lid pivotally mounted to one of said vertical walls, and said light source being mounted on said lid.

25. The apparatus defined in claim 24, an electrical power circuit for said light source including switch means operable to energize said light source when said lid is closed and to deenergize said light source when said lid is opened.

26. The apparatus defined in claim 21, comprising means connected to one of said walls for supporting an object within said chamber.

27. The apparatus defined in claim 21, comprising a transparent bottom plate covering said bottom opening.

28. The apparatus defined in claim 27, comprising a transparent plate removably mounted within said chamber above said bottom plate and an object supported between said plates for providing background images onto the resultant reproduction.

29. Apparatus as defined in claim 27, comprising markings on said transparent bottom plate which indicate the size of the object on the reproduction.

30. Apparatus as defined in claim 27, comprising means visible on said transparent bottom plate to indicate date and/or time on the reproduction.

31. Apparatus as defined in claim 21, comprising adjustable roll-up shade means mounted above said bottom opening to selectively shade areas of the bottom opening.

32. The apparatus defined in claim 21, said top wall converging upwardly and inwardly from said vertical walls and said light source being mounted on said top wall, and light diffuser means mounted beneath said light source.

33. Apparatus as defined in claim 32, said top wall being a lid pivotally mounted to one of said vertical walls to open and close the top of said chamber.

34. Apparatus as defined in claim 33, said light diffuser means being mounted on said lid.

35. Apparatus as defined in claim 32, the inside surfaces of said walls being light reflective.

36. Apparatus as defined in claim 35, said top wall being a lid pivotally mounted to one of said vertical walls to open and close the top of said chamber.

37. Apparatus as defined in claim 36, said light diffuser means being mounted on said lid.

38. Apparatus as defined in claim 21, comprising light diffuser means mounted beneath said light source.

39. Apparatus as defined in claim 21, comprising a viewing window in said vertical wall means.

40. Apparatus as defined in claim 21, comprising a side entry opening in said vertical wall means.

* * * * *